(12) United States Patent
Anderson

(10) Patent No.: US 6,954,899 B1
(45) Date of Patent: Oct. 11, 2005

(54) HUMAN-COMPUTER INTERFACE INCLUDING HAPTICALLY CONTROLLED INTERACTIONS

(75) Inventor: Thomas G. Anderson, Albuquerque, NM (US)

(73) Assignee: Novint Technologies, Inc., Albuquerque, NM (US)

( * ) Notice: Subject to any disclaimer, the term of this patent is extended or adjusted under 35 U.S.C. 154(b) by 525 days.

(21) Appl. No.: 09/785,696

(22) Filed: Feb. 16, 2001

Related U.S. Application Data

(63) Continuation-in-part of application No. 08/834,642, filed on Apr. 14, 1997, and a continuation-in-part of application No. 08/834,616, filed on Apr. 14, 1997, now Pat. No. 6,208,349.

(60) Provisional application No. 60/202,448, filed on May 6, 2000.

(51) Int. Cl.[7] .......................... G06F 3/00; G06F 3/033; G09G 5/08
(52) U.S. Cl. ...................... 715/701; 715/702; 715/765; 715/784; 715/858; 715/862; 345/157
(58) Field of Search ............................... 345/702, 701, 345/700, 856, 862, 858, 861, 156, 163, 159, 345/157; 715/700–702, 764, 765, 784, 786, 715/808, 828, 830, 856, 858, 861, 862, 973, 715/977

(56) References Cited

U.S. PATENT DOCUMENTS

| | | |
|---|---|---|
| 4,766,423 A | 8/1988 | Ono |
| 5,296,871 A | 3/1994 | Paley |
| 5,459,382 A | 10/1995 | Jacobus et al. |
| 5,506,605 A | 4/1996 | Paley |
| 5,555,366 A | 9/1996 | Teig |
| 5,576,727 A | 11/1996 | Rosenberg et al. |
| 5,629,594 A | 5/1997 | Jacobus et al. |
| 5,714,977 A | 2/1998 | McNeil |
| 5,734,373 A | 3/1998 | Rosenberg et al. |
| 5,734,805 A | 3/1998 | Isensee |
| 5,739,811 A | 4/1998 | Rosenberg et al. |
| 5,781,172 A | 7/1998 | Engel |
| 5,784,052 A | 7/1998 | Keyson |
| 5,825,308 A | 10/1998 | Rosenberg et al. |
| 5,831,408 A | 11/1998 | Jacobus et al. |
| 5,844,392 A | 12/1998 | Peurach et al. |
| 5,874,956 A | 2/1999 | LaHood |
| 5,889,670 A | 3/1999 | Schuler et al. |
| 5,929,607 A | 7/1999 | Rosenberg |
| 5,956,484 A | 9/1999 | Rosenberg et al. |

(Continued)

OTHER PUBLICATIONS http://www.novint.com/links/publications/publications.html, Novint technologies publications link.

(Continued)

Primary Examiner—X. L. Bautista
(74) Attorney, Agent, or Firm—V. Gerald Grafe

(57) ABSTRACT

The present invention provides a method of human-computer interfacing that provides haptic feedback to control interface interactions such as scrolling or zooming within an application. Haptic feedback in the present method allows the user more intuitive control of the interface interactions, and allows the user's visual focus to remain on the application. The method comprises providing a control domain within which the user can control interactions. For example, a haptic boundary can be provided corresponding to scrollable or scalable portions of the application domain. The user can position a cursor near such a boundary, feeling its presence haptically (reducing the requirement for visual attention for control of scrolling of the display). The user can then apply force relative to the boundary, causing the interface to scroll the domain. The rate of scrolling can be related to the magnitude of applied force, providing the user with additional intuitive, non-visual control of scrolling.

22 Claims, 3 Drawing Sheets

U.S. PATENT DOCUMENTS

| | | | | |
|---|---|---|---|---|
| 5,973,670 | A | * | 10/1999 | Barber et al. ............... 345/157 |
| 5,990,869 | A | * | 11/1999 | Kubica et al. .............. 345/163 |
| 6,028,593 | A | | 2/2000 | Rosenberg et al. |
| 6,101,530 | A | | 8/2000 | Rosenberg et al. |
| 6,125,385 | A | | 9/2000 | Wies et al. |
| 6,131,097 | A | | 10/2000 | Peurach et al. |
| 6,147,674 | A | | 11/2000 | Rosenberg et al. |
| 6,154,198 | A | | 11/2000 | Rosenberg et al. |
| 6,154,201 | A | | 11/2000 | Levin et al. |
| 6,161,126 | A | | 12/2000 | Wies et al. |
| 6,166,723 | A | | 12/2000 | Schena et al. |
| 6,232,891 | B1 | * | 5/2001 | Rosenberg .................. 345/163 |
| 6,259,382 | B1 | * | 7/2001 | Rosenberg .................. 345/168 |
| 6,353,850 | B1 | * | 3/2002 | Wies et al. .................. 709/203 |
| 6,496,200 | B1 | * | 12/2002 | Snibbe et al. ............... 345/701 |

OTHER PUBLICATIONS http://haptic.mech.northwestern.edu/library, Haptics community Web page.

http://www.cim.mcgill.ca/~haptic/publicatons.html, Selected publications.

wsiwyg://main.15/http://marg.www . . . ple/marg/haptics-bibliography.html, Haptics bibliography.

http://www.hitl.washington.edu/publications, hit lab publications.

http://www.caip.rutgers.edu/vrlab/pu-b.html, Human-Machine Interface Lab.

http://www.haptics-e.org, Haptics-e, The Electronic Journal Of Haptics Research.

http://intron.kz.tsukuba.as.jp/LHX/icat97.html, A versatile software platform for visual/haptic environment, Hashimoto et al.

http://www.novint.com/links/links.html.

http://www.novint.com/links/products/products.html.

MUSE (Multidimensional, User-oriented Synthetic Environment), International Journal of Virtual Reality, vol. 1 no. 1, winter 1995.

OpenGL® Programming Guide, Third Edition, *OpenGL Architecture Review Board*.

http://www.sensable.com/products/ghost.htm.

* cited by examiner

HUMAN-COMPUTER INTERFACE INCLUDING HAPTICALLY CONTROLLED INTERACTIONS

PRIORITY CLAIM

This application claims the benefit of U.S. Provisional Application No. 60/202,448, filed on May 6, 2000, and as a continuation-in-part of U.S. patent application Ser. Nos. 08/834,642 and 08/834,616, now U.S. Pat. No. 6,208,349, each of which was filed on Apr. 14, 1997, all of which are incorporated herein by reference.

This invention was made with Government support under Contract DE-AC04-94AL85000 awarded by the U.S. Department of Energy. The Government has certain rights in the invention.

BACKGROUND OF THE INVENTION

This invention relates to the field of human-computer interfaces, specifically those relating to methods of intuitively controlling interactions such as scrolling and zooming.

Computing technology has seen a many-fold increase in capability in recent years. Processors work at ever higher rates; memories are ever larger and faster; mass storage is larger and cheaper every year. Computers now are essential elements in many aspects of life, and are often used to present three dimensional worlds to users, in everything from games to scientific visualization.

The interface between the user and the computer has not seen the same rate of change. Screen windows, keyboard, monitor, and mouse are the standard, and have seen little change since their introduction. Many computers are purchased with great study as to processor speed, memory size, and disk space. Often, little thought is given to the human-computer interface, although most of the user's experience with the computer will be dominated by the interface (rarely does a user spend significant time waiting for a computer to calculate, while every interaction must use the human-computer interface).

Present human-computer interfaces generally rely on visual feedback. A document in a word processor or editor, for example, is displayed to the user. The user can position a cursor by moving a mouse; visual feedback of the display of a cursor allows the user to effectively control the cursor position. The user can also edit the document by typing, cutting, or pasting, for example, again using visual feedback to effectively control the computer application.

Using visual feedback for all aspects of a human-computer interface, however, can require that the user constantly change the visual focus. For example, in a word processor, the user can focus on the text, directing visual attention to the text and the edits the user is making. Movement of the cursor, or scrolling through the document, requires that the user divert attention from the text editing and to the cursor control or scrolling operation. Once the cursor has been repositioned or the document scrolled to the appropriate place, then the user must once again redirect attention from the scrolling and cursor interaction to the editing interaction. The overload of the visual feedback path (by sharing it for various different functions) can result in decreased human-computer interaction efficiency. Further, fine control of scrolling can be difficult using just visual feedback, a difficulty made even worse by the overload of the visual feedback path.

Accordingly, there is a need for new methods of human-computer interaction that make use of other feedback paths, reducing the overload of the visual feedback path.

SUMMARY OF THE INVENTION

The present invention provides a method of human-computer interfacing that provides haptic feedback to control interface interactions such as scrolling or zooming within an application. Haptic feedback in the present method allows the user more intuitive control of the interface interactions, and allows the user's visual focus to remain on the application. The method comprises providing a control domain within which the user can control functions such as scrolling or zooming. For example, a haptic boundary can be provided corresponding to scrollable or scalable portions of the application domain. The user can position a cursor near such a boundary, feeling its presence haptically (reducing the requirement for visual attention for control of scrolling of the display). The user can then apply force relative to the boundary, causing the interface to scroll the domain. The rate of scrolling can be related to the magnitude of applied force, providing the user with additional intuitive, non-visual control of scrolling.

The method also comprises providing a control domain, corresponding to scrollable or scalable directions in the application domain. The user can control scrolling or zooming in the application domain by interacting with the control domain as discussed previously for the application domain scrollable boundaries.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a method of human-computer interfacing that provides haptic feedback to control interactions such as scrolling or zooming within an application. Haptic feedback in the present method allows the user more intuitive control of interactions, and allows the user's visual focus to remain on the application. The method comprises providing a control domain within which the user can control interactions. For example, a haptic boundary can be provided corresponding to scrollable or scalable portions of the application domain. The user can position a cursor near such a boundary, feeling its presence haptically (reducing the requirement for visual attention for control of scrolling of the display). The user can then apply force relative to the boundary, causing the interface to scroll the domain. The rate of scrolling or zooming can be related to the magnitude of applied force, providing the user with additional intuitive, non-visual control of scrolling.

Haptic Control of Scrolling

Figure 1:
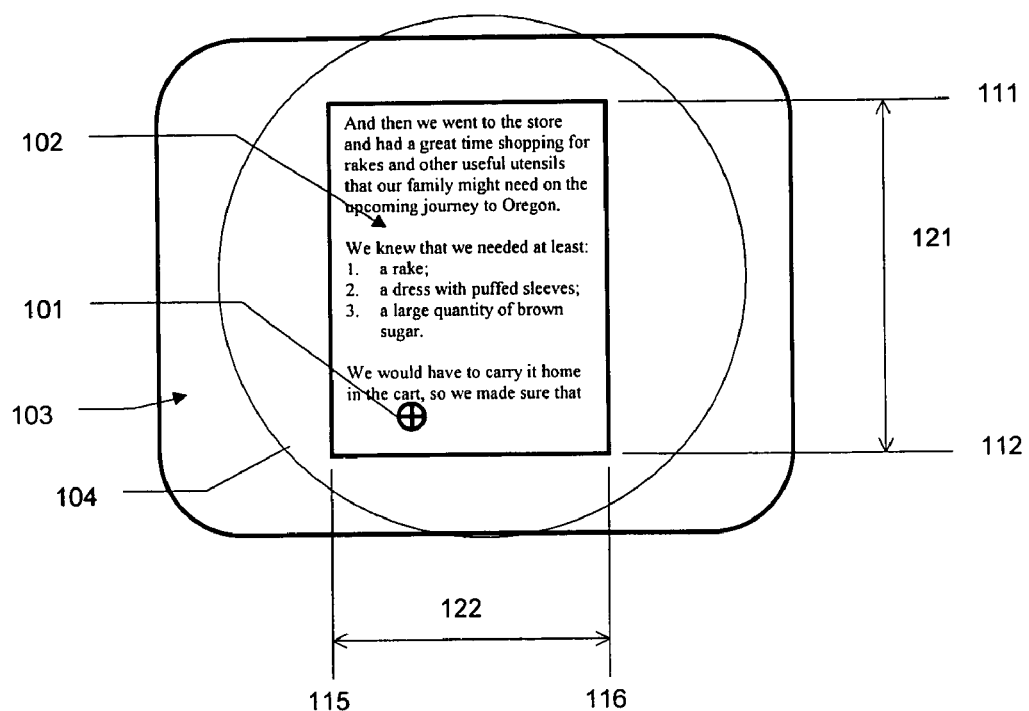
FIG. 1 is an illustration of a computer display, illustrating display of a portion of an item and associated visual and haptic boundaries.

FIG. 1 shows a computer display 103, including a portion thereof used to display a portion of an item such as a computer representation of a document 102. "Document" as used herein includes any information amenable to display with a computer, including without limitation text documents, pictures, drawings, word processing documents, and spreadsheets. Superimposed is an indication of a plane of a haptic space comprising the range of motion 104 of an input device (not shown). Note that, while the figure shows two dimensions for simplicity, the haptic space can comprise more than two dimensions. Even in a two dimensional application, a third dimension can be used, for example by making scrolling boundaries perceptible in front of (or nearer to) the user. A user can position a visual cursor 101 within the display by moving the input device. Movement of the input device can also determine the position of a haptic cursor, where the position of the haptic cursor is representative of the relation of the input device to haptic forces (e.g., the distance of the input device from a haptic boundary). The haptic cursor does not have to correspond to the visual cursor, but for ease of exposition we can consider the haptic cursor, within the input device range of motion 104, to correspond to the visual cursor, within the visual display 103.

The portion of the item displayed 102 can be defined by visual boundaries 111, 112, 115, 116, defining ranges 121, 122. Visual boundaries can be part of the display presented to the user, or can correspond to edges of the display itself, or can be not normally visible (as discussed later). The user can experience the document as though there were a window into the document. The user's view of the document is therefore limited by the boundaries of the window. The user can control the relative positioning of the window and document by controlling movement of the document, the window, or both. Relative motion in the plane of the document to expose various portions of the document provides an interaction commonly called scrolling. Relative motion normal to the plane of the document can control the apparent distance from the window to the document, changing the scale of the portion displayed (an interaction commonly called zooming). Both scrolling and zooming are contemplated by the term "interaction" as used herein.

Conventional scrolling and zooming controls require the user to either explicitly control the interaction (e.g., by pushing arrow keys or moving a mouse over an object) or manipulate the visual cursor (e.g., by moving the visual cursor past the visual boundaries); manipulation of the visual cursor requires that the attention of the user be diverted from the document to the cursor control. The present invention can provide haptic boundaries to make interaction control more efficient. As with the haptic/visual cursors, the haptic boundaries do not have to correspond with the visual boundaries, but for ease of exposition we will consider them as corresponding. Consequently, in FIG. 1, haptic boundaries are established within the range of motion 104 of the input device corresponding with the visual boundaries within the display. Movement of the visual cursor near a visual boundary accordingly corresponds with movement of the haptic cursor near the corresponding haptic boundary. When the haptic cursor approaches a haptic boundary, a force can be applied to the input device, resisting further motion of the haptic cursor relative to the haptic boundary (e.g., motion into or toward the haptic boundary). The user can thereby feel the boundaries of the portion of the item, providing greater control of the interaction (i.e., the rate of scrolling or zooming) and reducing the need for visual feedback. Once the user feels a boundary, the user can apply additional force to the input device, in opposition to the force applied by the interface, to control the interaction. The user accordingly can use the sense of touch (e.g., kinesthetic and proprioceptive senses) to control the interaction, instead of visual, leaving the visual feedback path available for the remainder of the human-computer interface. The present invention also embraces similar interaction control by pulling (applying force away from the boundary) to control the interaction instead of pushing, and control of the interaction by forces applied by the user to a non-mobile force input device.

The rate of scrolling can be determined from the force applied by the user. For example, if the user does not apply force greater than a threshold force, then the interface can determine that the user is just feeling the presence of the boundary and does not desire scrolling, and consequently can leave the visual display un-scrolled. Force in excess of the threshold can indicate that the user is pushing against the boundary of the window and desires that the window be moved (equivalent to scrolling, as discussed above), and the interface can change the display of the item to a portion adjacent the boundary. The scrolling rate can also be adjusted according to the magnitude of the force applied by the user. For example, greater applied force can initiate faster scrolling, providing an intuitive interface characteristic of "push harder to scroll faster".

The method of the present invention is suitable for use in interfaces with various haptic or force feedback devices. It can be implemented in computer hardware or computer software, using conventional programming tools and computer systems.

Haptic Control of Scrolling or Zooming Using a Control Zone

Figure 2:
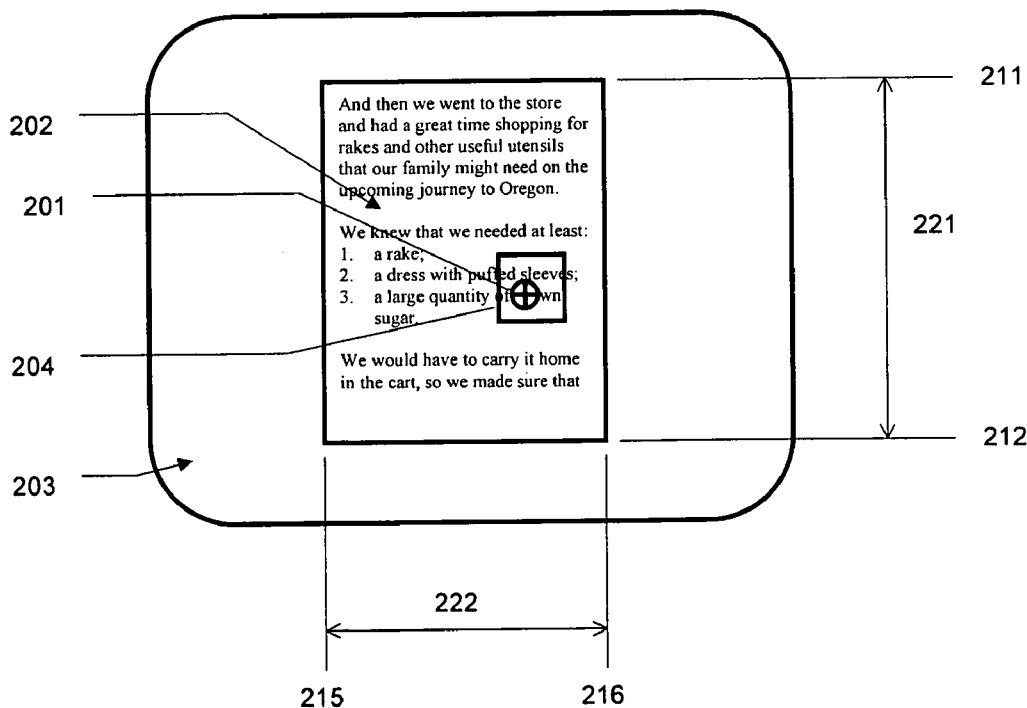
FIG. 2 is an illustration of a computer display and a control zone.

FIG. 2 shows a similar computer display arrangement as in FIG. 1, with the addition of a control zone 204. The control zone 204 is shown as overlaid visually on the display of the portion of the item; it can also be to a side, popped up when indicated, or not on the display at all. The control zone, when active, comprises all or a portion of the range of motion of the input device. In operation, the user indicates a transition into the control zone, then, once in the control zone, pushes against boundaries of the control zone to control scrolling or zooming of the item in the display. The desired interface characteristics can influence the accessibility of the control zone. For example, the control zone can be accessible in a two-dimensional interface, at prescribed depths of a three-dimensional interface, or at all depths of a three-dimensional interface.

The user can indicate a transition into the control zone in various ways. Several examples are presented below.

One Dimensional Control Zone

Figure 3A:
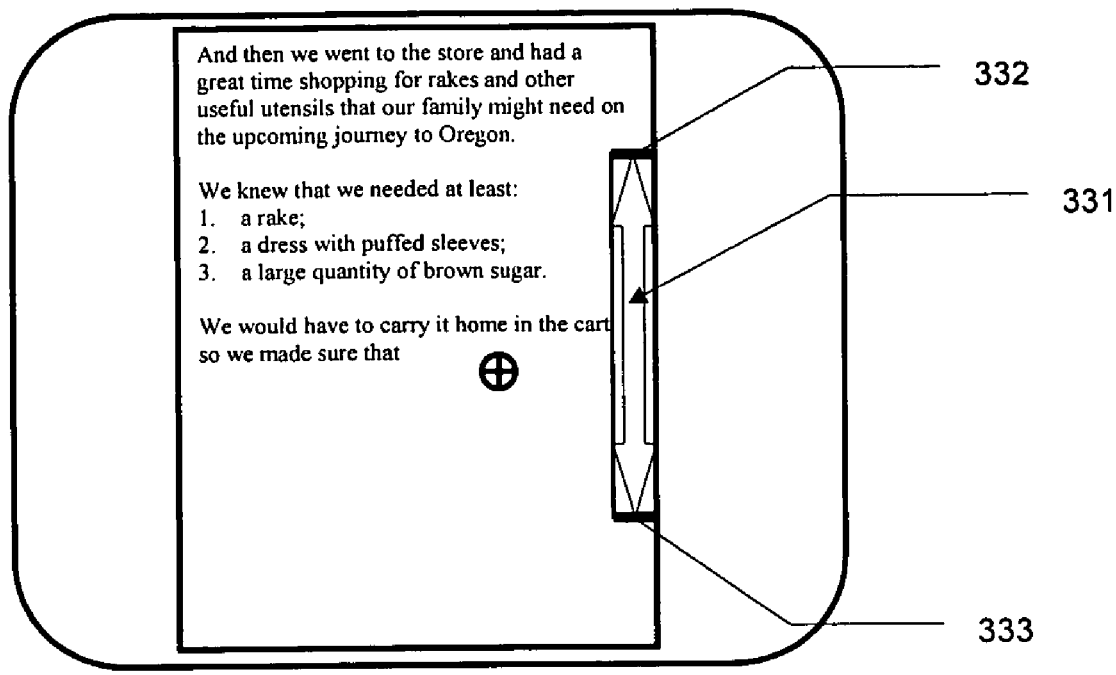
FIG. 3a is an illustration of a computer display and associated haptic boundaries.

FIG. 3a is an illustration of a computer display and associated haptic boundaries. The display comprises a control zone 331 near the right edge. The control zone 331 has haptic boundaries near its upper 332 and lower 333 extremes. The user can interact with the item (e.g., edit a document) when the cursor is not in the control zone. The user can move the cursor across the left boundary of the control zone, then push against either of the control boundaries 332, 333 to haptically control scrolling. The transition into the control zone can be determined by the user, as examples, by visual feedback, or by applying a haptic resistive force that the user must overcome before allowing the cursor into the scrolling zone. Similar control zones can be provided for scrolling in other dimensions. The control zone itself can be left out of the visible display; the user then feels the transition to the control zone, then feels the control of the scrolling (freeing up the visual feedback path for attention to the item).

An interface according to this example can be implemented according to the pseudocode below.
1. Determine cursor.position;
2. If (cursor.position ∈ control.zone) then
3. For all boundary in control.zone.boundaries
   a. If (|cursor.position − boundary | < threshold) then
      i. Apply force directed away from boundary to input device;
      ii. Determine user.force directed toward boundary;
      iii. Scroll(direction (boundary),rate(user.force));

Three-Dimensional Motion into a Control Zone

Figure 3B:
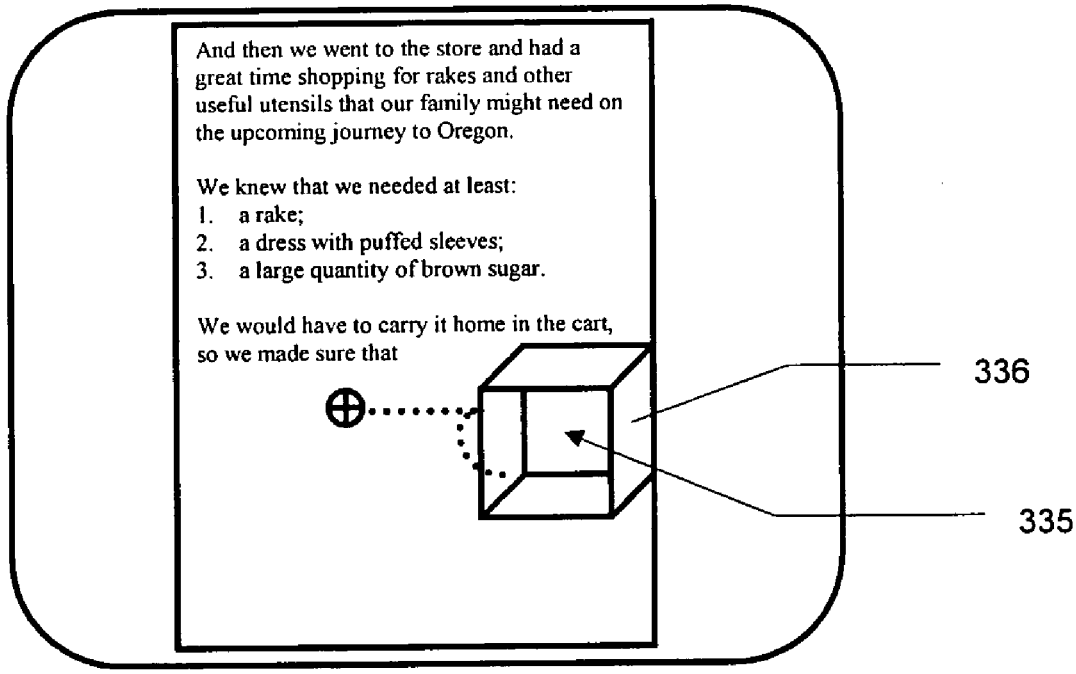
FIG. 3b is an illustration of the haptic space of a computer interface.

FIG. 3b is an illustration of the haptic space of a computer interface. A control zone 335 allows control as discussed above: pushing against the haptic walls 336 from within the control zone controls scrolling in the corresponding direction. The haptic walls 336 extend from the base of the zone, so that, once in the zone, the user cannot easily slip out (the walls can also be inclined inward to make it even harder to accidentally slip out). The walls also discourage unintended scrolling. When the user moves a cursor near a haptic wall, the interface can apply a resistive force to discourage the cursor from traversing the wall. The user moving a cursor across the haptic space along a path that encounters the walls 336 will be prevented by the walls from entering the zone. Entry into the control zone requires explicit motion by the user to move over the walls (e.g., an explicit command or a three-dimensional cursor movement).

The control zone can also comprise a closed portion of the space (e.g., a three dimensional box). The user can push through the walls to enter and exit, can supply an explicit command (e.g., voice or keyboard) for entry and exit, can touch a specific portion of the control zone (e.g., a switch inside the control zone) for entry or exit, or any combination. The use of a closed control zone allows a single control.zone to be used to control interactions in all dimensions relevant to a document; e.g., scroll left and right using the sides of the control zone, scroll up and down using the top and bottom of the control zone, and zoom in and out using the front and back of the control zone.

Figure 3C:
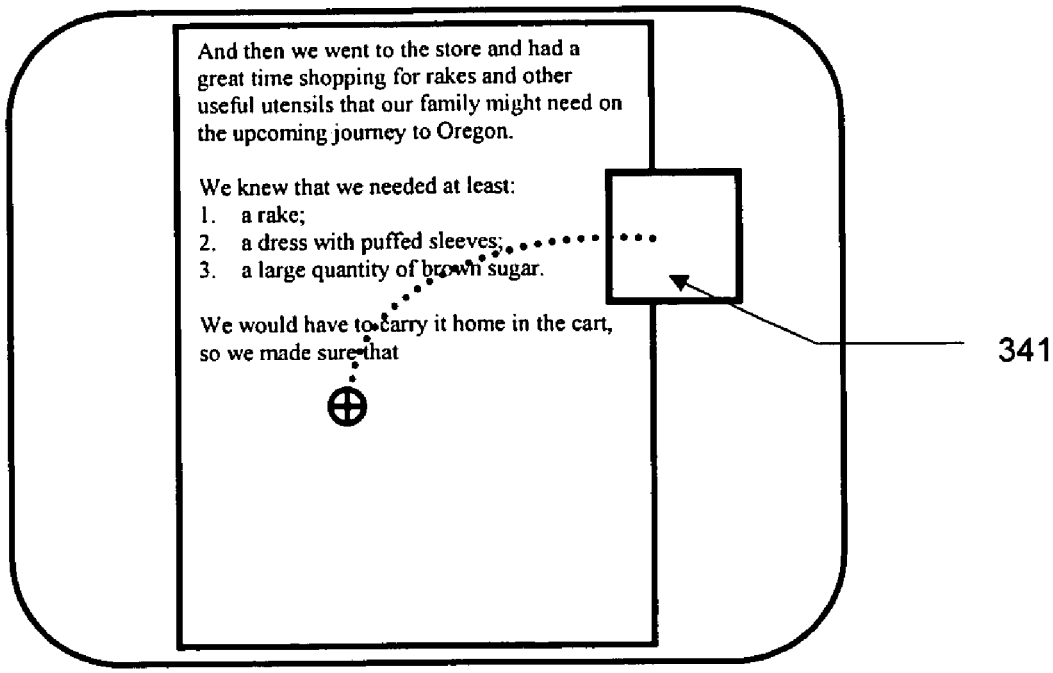
FIG. 3c is an illustration of a computer display with a separate control zone.

An interface according to this example can be implemented according to the pseudocode below.
1. Determine cursor.position;
2. If (cursor.position ∈ control.zone) ˆ
  (cursor.position ≦ zone.boundary.height) then
   a. For all boundary in control.zone.boundaries
      i. If (|cursor.position − boundary | < threshold1) then
        1. Apply force directed away from boundary to input device;
        2. Determine user.force directed toward boundary;
        3. Scroll(user.force);
3. If (cursor.position ∉ control.zone) then
   a. If (|cursor.position − zone.boundary| < threshold2) ˆ
  (cursor.position ≦ zone.boundary.height) then
      i. Apply force directed away from zone.boundary to input device Explicit Transitions into a Scrolling Zone FIG. 3c is an illustration of a computer display with a separate control zone 341. The control zone in this example can be made not accessible by simple cursor motion, eliminating the possibility of inadvertent cursor motion scrolling. The interface can provide for transition of the cursor into the control zone responsive to explicit direction from the user, for example, by voice command, keyboard control, or activation of a switch or button. Once in the control zone, the user can control scrolling by applying force against the boundaries of the zone, as discussed above. The interface can provide for transition out of the control zone by explicit direction, for example by the same mechanism as for entry, or by a simple inverse thereof.

An interface according to this example can be implemented according to the pseudocode below.
1. when (control.entry.command ˆ not.in.control.mode) then
   a. cursor.position = initial. control.cursor.position
   b. in.control.mode
2. when (control.exit.command ˆ in.control.mode) then
   a. cursor.position = restore.cursor.position
   b. not.in.control.mode
3. when (in.control.mode)
   a. determine cursor.position;
   b. For all boundary in control.zone.boundaries
      i. If (|cursor.position − boundary| < threshold) then
        1. Apply force directed away from boundary to input device;
        2. Determine user.force directed toward boundary;
        3. Scroll(user.force);

Attendant Control Zone

Figure 3D:
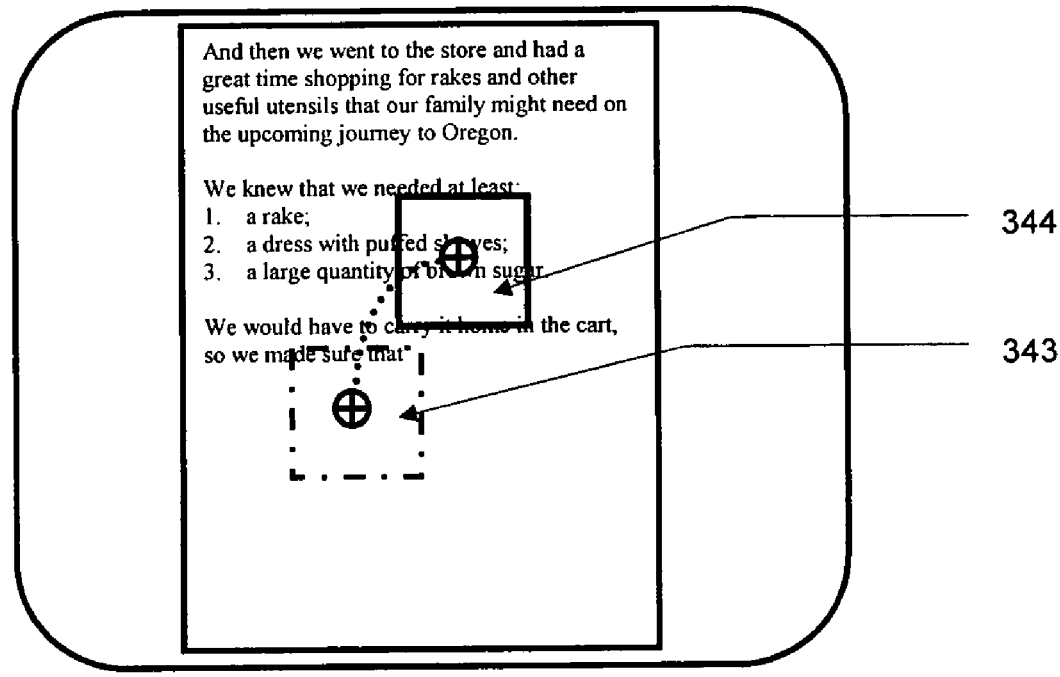
FIG. 3d is an illustration of a haptic space having an attendant control zone.

FIG. 3d is an illustration of a haptic space having an always-attendant control zone 343, 344. The user can indicate a transition to control as discussed in the preceding example. The control zone 343 surrounds the cursor, but the zone's haptic boundaries are not active until the user indicates a transition to control. When the user indicates a transition to control, the control zone 344 is made active surrounding the position of the cursor when the transition was indicated (adjusted, perhaps, when the cursor is too near some constraint such as an boundary of the computer space). The user has the control facility always available, and always in a consistent relationship to the cursor when called on. Once the control zone is activated, the user can control scrolling by applying force to the boundaries of the zone. The interface can provide for transition out of the control zone by a similar mechanism as used to enter, for example by a simple inverse (e.g., if pushing a button causes the zone to become active, then releasing the button can cause the zone to become inactive). The control zone accordingly need not consume any of the available display space when inactive, and, if made part of the haptic space but not the visual space, need never consume any of the available visual display space. An always-attendant control zone comprising a closed space can provide an intuitive interaction control: the control zone can be reliably accessed whenever needed, and all interaction controls provide the same intuitive haptic characteristics.

An interface according to this example can be implemented according to the pseudocode below.
1. when (control.entry.command ^ not.in.control.mode) then
   a. in.control.mode
2. when (control.exit.command ^ in.control.mode) then
   a. not.in.control.mode
3. when (in.control.mode)
   a. determine cursor.position;
   b. For all boundary in control.zone.boundaries
      i. If (|cursor.position − boundary| < threshold) then
         1. Apply force directed away from boundary to input device;
         2. Determine user.force directed toward boundary;
         3. Scroll (user.force);

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

I claim:

1. A method of providing user control of interactions in a computer display of an item, comprising:
   a) Displaying a portion of the item;
   b) Determining if a user-positioned cursor is within a threshold distance from an interaction boundary within the display, and if so, then:
      i) applying a force to the cursor and communicating the force to the user;
      ii) determining an input responsive force applied by the user to the input device;
      iii) changing the portion of the item displayed, wherein the rate of change is determined from the input responsive force.

2. The method of claim 1 wherein changing the portion of the item displayed comprises changing the display to correspond to a portion adjacent the previous portion in the direction of the boundary.

3. The method of claim 1 wherein the item is a computer representation of a document.

4. The method of claim 3 wherein scrollable boundaries correspond to the top and bottom of the display, and wherein scrolling in the direction of the top boundary is disabled when the top of the document is displayed, and wherein scrolling in the direction of the bottom boundary is disabled when the bottom of the document is displayed.

5. The method of claim 1 wherein the rate of change increases with increasing input responsive force.

6. A computer-readable medium having stored thereon computer-executable instructions for performing the method of claim 1.

7. In a computer system providing display of a computer representation of a document, and user selection of the portion of the document to be displayed, a method of providing user control of scrolling among portions of the document comprising:
   a) From the boundaries of the portion of the document displayed, determining which correspond to limits of the document;
   b) For each boundary, establishing a haptic boundary in the range of motion of an input device approximately coincident with the visual boundary in the display;
   c) Determining the position of a haptic cursor and, if the haptic cursor is near a haptic boundary that does not correspond to a limit of the document, then
      i) Applying a force to the input device resisting motion of the input device toward said haptic boundary;
      ii) Determining a user force applied by the user directed toward said haptic boundary;
      iii) Scrolling the visual display of the document in the direction of said user force.

8. The method of claim 7, wherein the rate of scrolling is determined from the magnitude of the user force.

9. A computer-readable medium having stored thereon computer-executable instructions for performing the method of claim 7.

10. In a computer interface comprising a display and a haptic space, a method of providing user control of interactions, comprising:
    a) Displaying a portion of an item;
    b) Providing a control portion of the haptic space;
    c) Determining if a user-positioned haptic cursor is within the control portion, and if so, then determining if the haptic cursor is within a threshold distance from a controllable boundary of the control portion, and if so, then:
       i) applying a feedback force to a user input device affecting additional motion of the cursor relative to the boundary;
       ii) determining an input force applied by the user to the input device;
       iii) changing display of the item, wherein the rate of change is determined from the input force.

11. The method of claim 10, wherein the rate of change is determined from the magnitude of the input force.

12. The method of claim 10, wherein the control portion is activated responsive to direction of the user.

13. The method of claim 10, wherein determining if a user-positioned haptic cursor is within the control portion comprises moving the haptic cursor responsive to user control of an input device, and determining if such movement moves the haptic cursor within the control portion.

14. The method of claim 10, wherein determining if a user-positioned haptic cursor is within the control portion comprises detecting an indication from the user to move the cursor into the control portion.

15. The method of claim 10, wherein providing a control portion comprises providing haptic boundaries separating the control portion from the remainder of the haptic space.

16. The method of claim 15, wherein determining if a user-positioned haptic cursor is within the control portion comprises moving the haptic cursor responsive to user control of an input device, and determining if such movement moves the haptic cursor near a boundary, and if so, then applying a force to a user input device affecting further motion relative to said boundary.

17. A computer-readable medium having stored thereon computer-executable instructions for performing the method of claim 10.

18. In a computer interface comprising a display and a haptic space and adapted to display a document, a method of providing user control of scrolling the display of the document comprising:
    a) Providing a scrolling zone portion of the haptic space, said portion disposed near an edge of the display of the document and extending from a first end to a second end oriented substantially parallel to the edge;
    b) Determining the position of a user-controllable cursor in the haptic space, and, if the user cursor is within the scrolling zone portion and within a threshold distance of the first end or the second end, then applying a feedback force to a user input device resisting motion of the haptic cursor toward the nearest end, and determining the magnitude of a force applied by the user in opposition to said feedback force, and scrolling the display of the document in the direction according to the nearest edge at a rate determined from the magnitude of the user-applied force.

19. In a computer interface comprising a display and a haptic space and adapted to display a document, a method of providing user control of the display of the document comprising:
  a) Detecting user activation of a control mode of interface;
  b) When not in control mode, providing a computer interface suitable for interaction with the document;
  c) When in control mode:
    i) establishing haptic boundaries relative to the position of a user-controlled cursor when the user activated the control mode of the interface;
    ii) determining the position of a user-controlled cursor in the haptic space, and, if the cursor is within a threshold distance of a haptic boundary, then applying a feedback force to a user input device affecting further motion of the cursor relative to said haptic boundary;
    iii) determining the magnitude of a user-input force applied by the user to the user input device, and changing the display of the document in a direction according to the haptic boundary nearest the cursor at a rate determined from the magnitude of the user-input force.

20. A method of controlling interaction with a computer display of a document, comprising:
  a) providing a three-dimensional control zone;
  b) determining if the user indicates a transition into the control zone, and if so, then determining if the user positions a cursor near a boundary of the control zone, and if so, then determining an input force applied by the user to an input device and changing the display according to the direction and magnitude of the input force;
  c) determining if the user indicates a transition out of the control zone, and if so, then providing interaction according to an application associated with the document.

21. A method as in claim 20, wherein:
  a) the input device is moveable by the user in a three-dimensional space, characterized by x and y dimensions corresponding to a plane approximately parallel to the document displayed, and by a z dimension approximately orthogonal to said plane; and
  b) the three-dimensional control zone comprises a portion of the three-dimensional space characterized by an entry region, defined by x, y, and z coordinates, and an active region, defined by x, y, and z coordinates, with the z coordinate not identical to the z coordinate of the entry region; and
  c) determining if the user indicates a transition into the control zone comprises determining if the user has moved the input device from the entry region to the active region; and
  d) determining if the user indicates a transition out of the control zone comprises determining if the user has moved the input device from the active region to the entry region.

22. A method as in claim 20, wherein:
  a) the input device is moveable by the user in a three-dimensional space, characterized by x and y dimensions corresponding to a plane approximately parallel to the document displayed, and by a z dimension approximately orthogonal to said plane; and
  b) a subset of the z dimension corresponds to a control portion; and
  c) determining if the user indicates a transition into the control zone comprises determining if the user has moved the device such that the z coordinate of the device is within the control portion; and
  d) determining if the user indicates a transition out of the control zone comprises determining if the user has moved the device such that the z coordinate of the device is not within the control portion.

* * * * *